United States Patent [19]

Munsch

[11] Patent Number: 5,129,826
[45] Date of Patent: Jul. 14, 1992

[54] RADIO CONTROLLED MODEL PILOT'S STATION

[76] Inventor: Robert J. Munsch, P.O. Box 126, Meridian, Calif. 95957-0126

[21] Appl. No.: 533,498

[22] Filed: Jun. 5, 1990

[51] Int. Cl.⁵ .............................................. G09B 7/00
[52] U.S. Cl. ........................................ 434/32; 434/33
[58] Field of Search ........................... 434/29–32, 434/37, 33, 34, 55, 372, 45; 272/73, 18; 446/7, 34, 36, 230, 232; 244/155 A, 190, 189; 297/311, 344, 345, 349

[56] References Cited

U.S. PATENT DOCUMENTS

| | | | |
|---|---|---|---|
| 1,247,161 | 11/1917 | Silverman. | |
| 4,143,436 | 3/1979 | Jones | 9/7 |
| 4,386,914 | 6/1983 | Dustman | 434/32 |
| 4,464,116 | 8/1984 | Schoolcraft | 434/33 |
| 4,600,239 | 7/1986 | Gerstein et al. | 297/349 |
| 4,710,129 | 12/1987 | Newman et al. | 273/DIG. 28 |
| 4,711,447 | 10/1987 | Mansfield | 272/73 |

OTHER PUBLICATIONS

"It's The Cockpit"–advertisement and description including instructions, illustrations, and photograph, Cockpit Control Systems, Phoenix, Ariz.

Primary Examiner—Richard J. Apley
Assistant Examiner—Glenn E. Richman
Attorney, Agent, or Firm—Christie, Parker & Hale

[57] ABSTRACT

The radio controlled model pilot's station provides realism for the radio controlled modeler in flying his models. The present invention provides a chair having a motorized, rotatable seat to keep the model in view while positioning a throttle quadrant and other aircraft controls in realistic positions easily accessible to the pilot. A resilient pad and releasable clamps incorporated on a moveable radio shelf for quick mounting and removal of the control radio allow interchanging of radios for multiple models or increased battery endurance, while the movable radio shelf allows ingress to and egress from the chair by the pilot without removal of the radio.

13 Claims, 6 Drawing Sheets

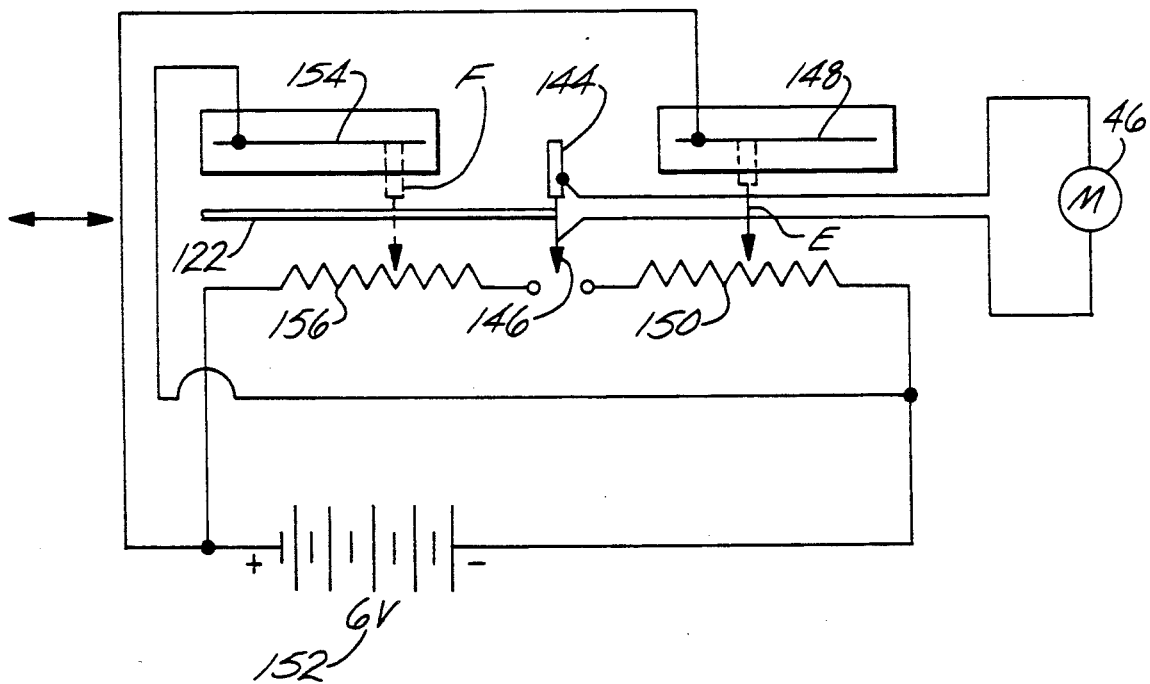

5,129,826

RADIO CONTROLLED MODEL PILOT'S STATION

FIELD OF THE INVENTION

The invention relates generally to devices for simulating an aircraft pilot's cockpit for operation of radio controlled models. More specifically, the present invention provides a chair having a motorized rotatable seat with a throttle quadrant, means for accommodating a control radio and foot rest with integral rudder bar to allow the radio controlled model pilot easy access to all controls while maintaining visual contact with the model.

BACKGROUND OF THE INVENTION

Radio controlled models of aircraft, helicopters, cars, and boats is typically accomplished using a hand held radio transmitter having two joysticks and various switch controls which activate servo motors within the model. Using an aircraft model as an example, the radio has two joysticks; a first joystick controlling elevator and aileron servos in the model, and a second joystick controlling rudder and throttle for the engine of the model. Trim controls, landing gear retraction switches and other accessory switches are also provided. The pilot typically stands holding the radio in both hands while manipulating the joysticks and switches to control the aircraft. The radio is often suspended from straps or other carrying means to allow some freedom for the operator's hands, particularly for flying models. In order to maintain visual contact with the model, the operator must rotate his body. To ease fatigue, many pilots choose to operate their radio control units while seated. However, this limits the maneuvering of the aircraft to airspace in front of the chair to maintain easy visual contact. In many instances, the modeler will rest the radio in his lap to allow more freedom of his hands to operate the various switches and joysticks.

Several devices have been designed in order to add to the realism of flying the radio control model by increasing the similarity with an actual aircraft cockpit while reducing the model pilot's workload by supporting the radio and providing conventional controls within easy reach. An example of such a device is shown in U.S. Pat. No. 4,386,914, issued Jun. 7, 1983 to Larry L. Dustman. The prior art devices typically require mechanisms for attachment of the controls on the radio to the control levers, sticks, and pedals of the pilot's station. Further, removal and replacement of the radio requires significant time and effort. Devices such as the Dustman device require the pilot to maintain the model aircraft in airspace in front of the pilot to avoid craning the neck to maintain visual contact with the model.

It is desirable to provide a pilot's station which allows easy adaptation to a number of a radio transmitters with quick insertion and replacement capability. It is further desirable to provide a pilot's station which rotates under the command of the pilot to allow visual contact to be maintained with the model regardless of location. It is also desirable to have a device which is simple in construction for reduced cost and ease of fabrication.

SUMMARY OF THE INVENTION

The present invention provides a radio control model pilot's station on which a standard radio transmitter system having dual joysticks and other servo controls may be mounted. A chair which includes a base and a rotatable seat is provided for the pilot. A foot rest is suspended from the seat to maintain the pilot's feet off the ground during rotation of the seat. A shelf to accommodate the radio is pivotally mounted to the seat allowing a first position across the lap of the pilot seated in the chair and a second position rotated away from the pilot's lap to allow easy ingress and egress from the chair. The control radio is releasably mounted to the shelf using spring mounted clamps to secure the radio to a resilient pad to protect and accommodate various radio bottom configurations. A throttle quadrant is connected to the seat near the left hand of a seated pilot simulating the throttle quadrant in an aircraft. A rudder bar is pivotally mounted to the foot rest to simulate the rudder pedals in an aircraft cockpit and a control stick, releasably attachable to the aileron and elevator control joystick on the radio is positioned over the pilot's lap like the control stick of an aircraft when the radio shelf is in the operating position. The control stick is readily accessible with the pilot's right hand as in an actual aircraft. Interconnection means are provided for the rudder pedals and throttle quadrant to the second joystick on the radio. The first interconnection means is releasably attached to the joystick and moves the joystick laterally in response to the movement of the rudder bar. The second interconnection means from the throttle quadrant is also releasably attached to the joystick to move the joystick forward and rearward in response to a throttle lever on the throttle quadrant.

A drive means is provided to rotate the seat with respect to the base at the command of the pilot to maintain visual contact with the model. A second lever on the throttle quadrant is provided to control the drive means.

Releasably constraining the radio on the rotatable shelf allows easy access by the pilot to all extraneous switches on the radio while providing the realism of a control stick, rudder bar, and throttle quadrant positioned as in a real aircraft. The ability to rotate the shelf away from the pilot's lap allows easy access to the chair without requiring the removal of the radio while releasable attachment of the radio to the shelf and the interconnection means and control stick to the joysticks on the radio allows easy mounting, removal and interchange of radios for use with the pilot's station.

BRIEF DESCRIPTION OF THE DRAWINGS

The distinctive nature and characteristics drawings of the invention are better understood with respect to the following drawings and the claims appended hereto.

FIG. 3b is a schematic diagram of an infinitely variable reversible switch for control of the drive means.

DETAILED DESCRIPTION OF THE INVENTION

Figure 1A:
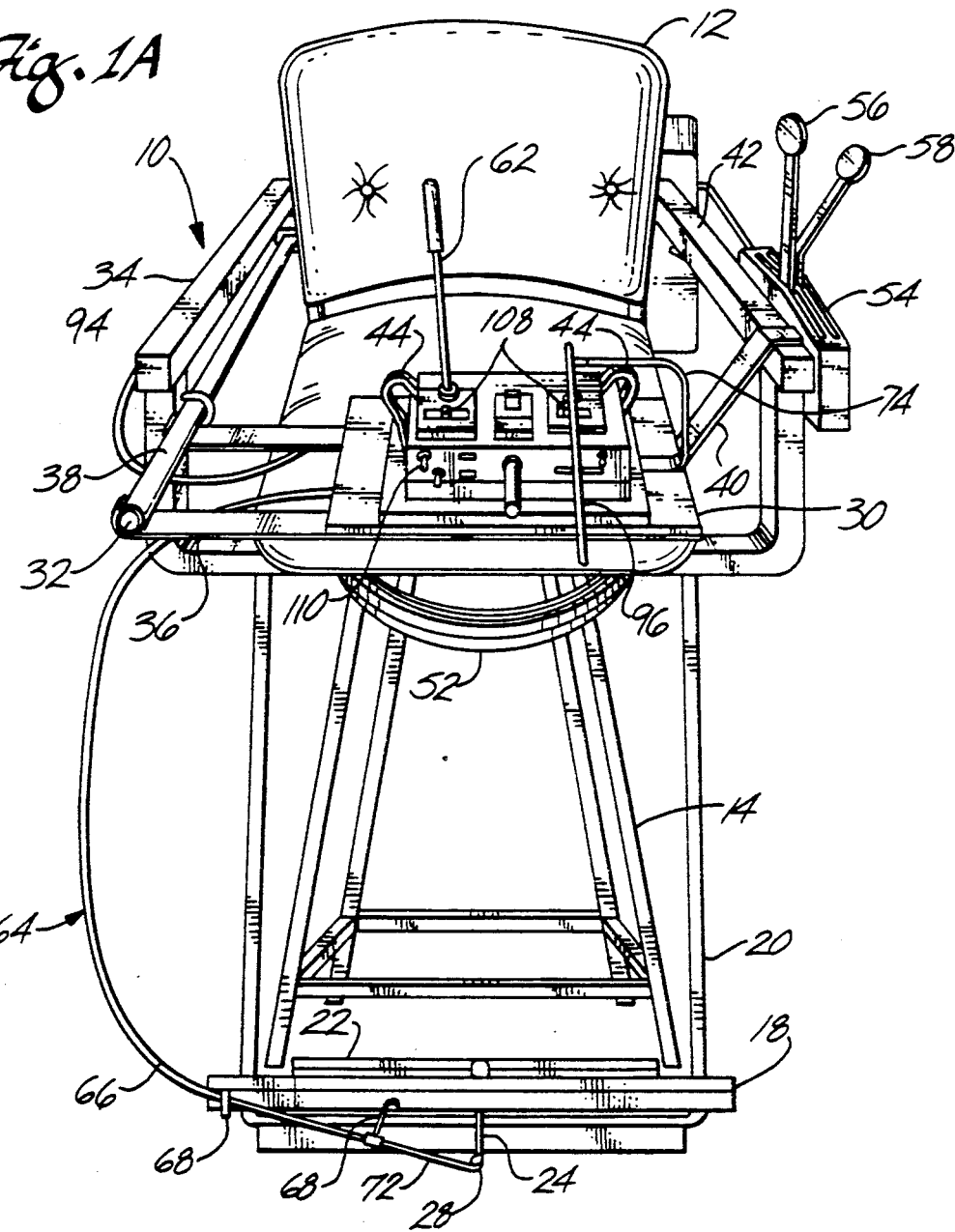
FIG. 1a is an upper front pictorial view of the pilot's station with the radio shelf in the operating position.
Figure 1C:
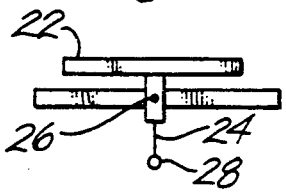
FIG. 1c is a sectional view of the footrest showing the pivotal attachment of the rudder bar.
Figure 1B:
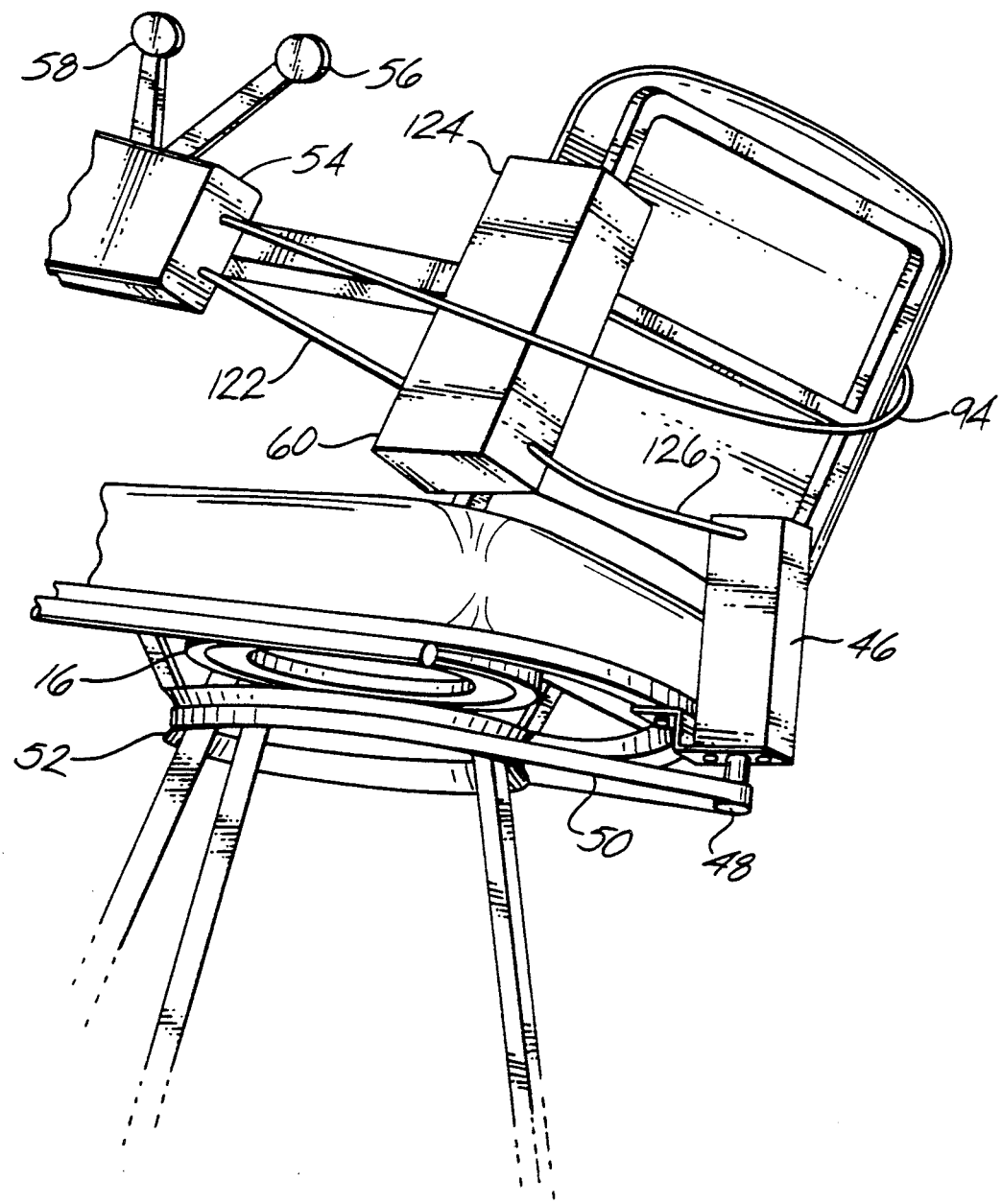
FIG. 1b is a lower left perspective view showing the drive means and throttle quadrant control attachment to the seat.

Referring now to the drawings, the overall configuration of the invention is shown in FIG. 1a. The pilot's station includes a chair 10 having a seat 12 and a base 14. The seat is rotatably mounted to the base with a roller bearing 16 as best seen in FIG. 1b. A foot rest 18 is attached to the seat using frame 20. The foot rest therefore rotates with the seat. A rudder bar 22 is pivotally attached to the foot rest as best seen in FIG. 1c. The rudder bar includes a lever extension 24 which extends through the foot rest opposite the pivot 26 from the rudder bar itself. Depressing one side of the rudder bar causes the extension 24 to rotate about the pivot providing lateral motion of the end 28 of the extension.

A radio shelf 30 is provided for mounting of the control radio. The shelf is pivotally mounted to the seat to allow a first operating position across the lap of the pilot as shown in FIG. 1a. In the embodiment shown in the drawings, the pivot for the radio shelf comprises a bar 32 parallel to one arm rest 34 of the seat. The shelf is attached to the pivot with brackets 36 engaging a sleeve 38 which receives the bar. The shelf may be rotated about the axis provided by the bar which lies in the plane of the shelf, upwardly away from the pilot's lap to a second open position with the radio shelf essentially vertically oriented to allow easy ingress and egress from the chair. An angled bracket 40 engages the second arm of the chair 42 to maintain the radio shelf in the horizontal operating position.

The control radio is releasably attached to the shelf using gripping members such as spring loaded clamps 44 which will be described in greater detail subsequently. As best seen in FIG. 1b, rotation of the seat on the base is provided by a drive means 46 which in the embodiment shown in the drawings is an electric motor. A first pulley 48 extending from the motor engages a belt 50 which drives a second pulley 52 attached to the seat bottom. Power for the electric motor may be provided through batteries (not shown) which may be attached to the chair or positioned on the ground and attached to the motor with cables.

A throttle quadrant 54 is attached to the left arm of the seat providing a position for a throttle lever 56 readily accessible with pilot's left hand similar to the cockpit in an actual aircraft. In the embodiment shown in the drawings, a second lever 58 in the throttle quadrant provides position control and is attached through a switch 60 to the motor as will be described in greater detail subsequently. In the embodiment shown in the drawings, for a typical radio having two joysticks, a control stick extension 62 is releasably attached to the first joystick to provide a realistic simulation of the joystick of an actual aircraft. Positioning of the control radio on the shelf over pilot's lap places the joystick in the proper position.

Figure 2A:
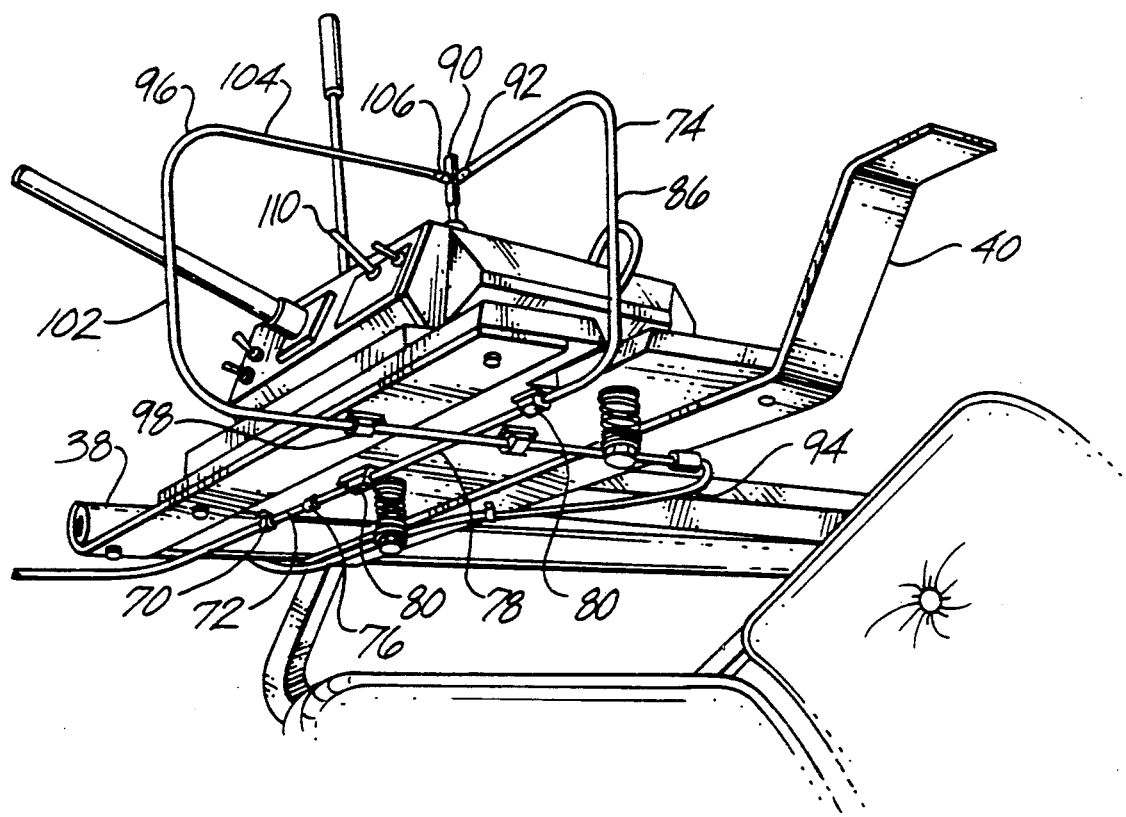
FIG. 2a is a detailed pictorial view showing the radio shelf in the rotated second position allowing ingress and egress from the seat while demonstrating details of the J-bar connection means for the second joystick and releasable attachment means for the radio.
Figure 2C:
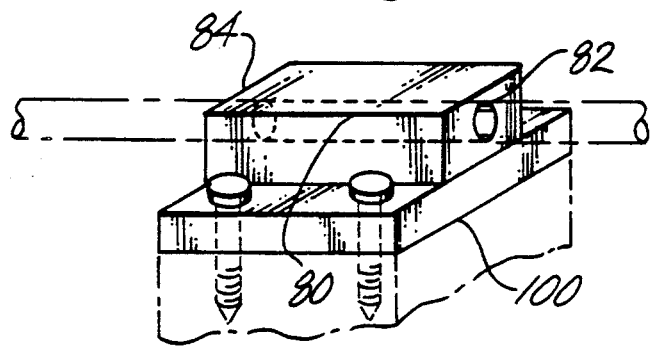
FIG. 2c is a pictorial view of the J-rod slide bearing.
Figure 2B:
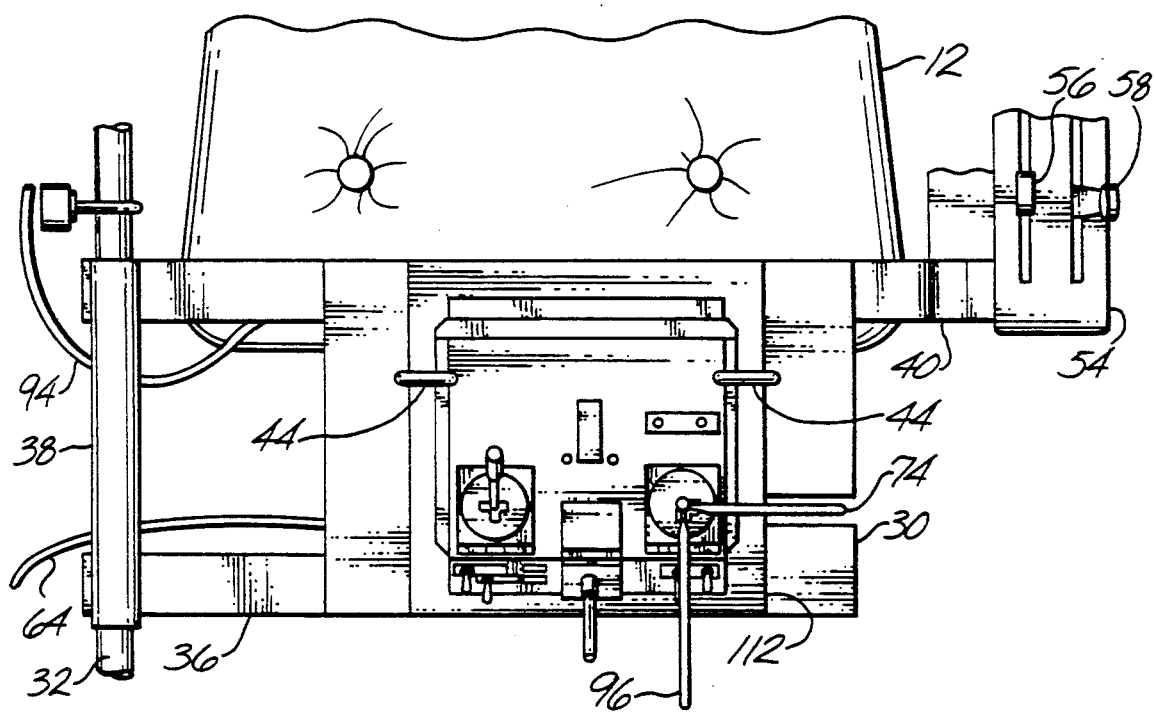
FIG. 2b is a top partial view of the pilot's station showing the radio shelf in the operating position, relative position of the throttle quadrant and attachment of the interconnection means to the second joystick.

In the embodiment shown, connection of the rudder bar to the second joystick on the radio is accomplished through a first control cable 64 which has an outer sheath 66 attached to the foot rest by clamps 68 and as best seen in FIG. 2a attached to the lower surface of the radio shelf with clamp 70. An inner cable 72 is connected to the end 28 of extension 24 from the rudder bar and to a first J-connector 74. A cable sold under the trade name "Gold-N-Rod" is employed. The inner cable is attached to a first end 76 of the J-connector. Sliding motion of the inner cable with respect to the outer sheath results from motion of the extension when the rudder bar is depressed as previously described. The translation of the rudder cable is transferred to the J-connector which has a first leg 78 constrained to the lower surface of the shelf with slide bushings 80. As best seen in FIG. 2c, the bushings each contain a bore 82 in a body portion 84 through which the first leg of the J-connector extends. The slide bushing constrains the J-connector for reciprocal motion along axis of the bore while allowing rotation by the leg about that axis. The bottom of the J-connector 86 extends around one side of the shelf and the second leg 88 of the J-connector then extends over the top of the shelf for connection to the second joystick. A sleeve 90 received over the second joystick is attached with a pivot pin 92 to the first J-connector.

Similarly, the throttle lever 56 is connected employing a second cable 94 having an outer sheath and inner cable as described for the first interconnection means. The inner cable of the second control cable attaches to a second J-connector 96 which has a first leg constrained on the bottom of the shelf with slide bushings having a configuration identical to that previously described, except for a reduced base dimension 100. The bottom 102 of the second J-connector extends around the side of the second shelf and a second leg 104 of the second J-connector extends over the top of the shelf and is attached with pivot pin 106 to the sleeve 90.

The second J-connector is oriented perpendicular to the first J-connector and reciprocal motion of the J-connector is translated through the pivot pin and sleeve into forward and rearward motion of the second joystick. As the first or second J-connector is moved, the other J-connector rotates within the slide bushings. Two degrees of freedom are thereby maintained whereby actuation of the rudder control through the first J-connector does not adversely affect the throttle setting resulting from the position of the second J-connector. Similarly, adjustment of the throttle setting through the second J-connector does not impact the rudder position.

The pin connection for the J-connectors to the sleeve is accomplished using a loose bolt connection providing play for rotation of the J-connectors as described. Similarly, connection of the inner cable of the Gold-N-Rods to the first end of the J-connector is accomplished with a threaded connection without a lock knot allowing free rotation of the J-connector.

The open configuration of the interconnection means using the J-connectors allows free access to all of the switches and adjustments of the radio including trim control slide switches 108 best seen in FIG. 1a and toggle switches generally designated 110 for landing gear, retraction, bomb drop and other radio functions. Routing of the interconnection cables to the right side of the radio shelf (as seen from the pilot's perspective) proximate the rotating sleeve allows movement of the shelf from the operating position to the open position without disconnection of the controls. The pilot may therefore enter and exit the chair with ease without rearrangement or removal of control cables and the like. Those skilled in the art will recognize that alternate mounting means for the control shelf including a pivot pin on the right arm of the seat allowing the shelf to be pivoted out and away from the seat about an axis perpendicular to the shelf to allow ingress and egress of the pilot may be also employed.

Figure 2D:
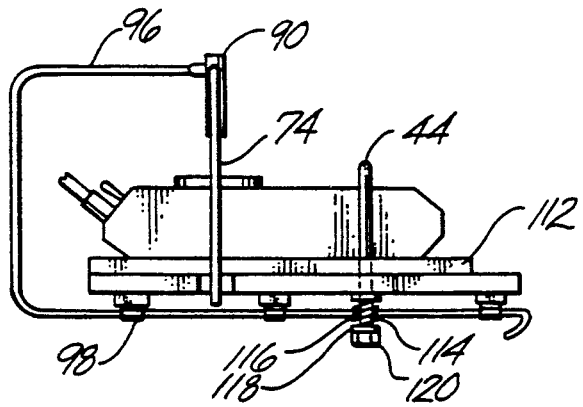
FIG. 2d is a side view of the radio shelf.

Mounting of the radio to the shelf is accomplished using releasable clamps 44 as previously described. In the embodiment shown, the resilient pad 112 best seen in FIG. 2d, is mounted to the shelf to receive the radio. This allows the radios of various size with differing configurations to be accommodated in the shelf. In the embodiment shown in the drawings, the clamp comprises a J-member engaging the top surface of the radio and extending through apertures in the shelf terminating in a threaded end 114. A spring 116 captured between a washer 118 and the lower surface of the shelf urges the clamp downward against the top surface of the radio. A nut 120 engaging the threaded end of the clamp constrains the washer.

The resilient pad adapts to irregularities in the transmitter bottom and prevents the transmitter from shifting once the clamps are in place. Removal and replacement of the radio transmitter from the shelf is accomplished by extending and rotating the clamps to free the radio and removing the sleeve from the second joystick. Typically, the J-connectors are flexible to allow vertical motion of the sleeve sufficient to clear the joystick without removal of the pins connecting the J-connectors to the sleeve. Consequently, attachment or removal of a radio transmitter to the present pilot's station may be accomplished in a matter of minutes and various radios may be employed during a single flying session. This is often required due to battery life and matching of radio transmitters and aircraft models.

Those skilled in the art will recognize alternate approaches for attachment of the spring including connection of one end of a spring to the upper surface of the shelf and to the clamp whereby upward extension of the clamp extends the spring thereby urging the clamp downwardly through tension of the spring as opposed to compression of the spring as in the present embodiment.

Figure 3A:
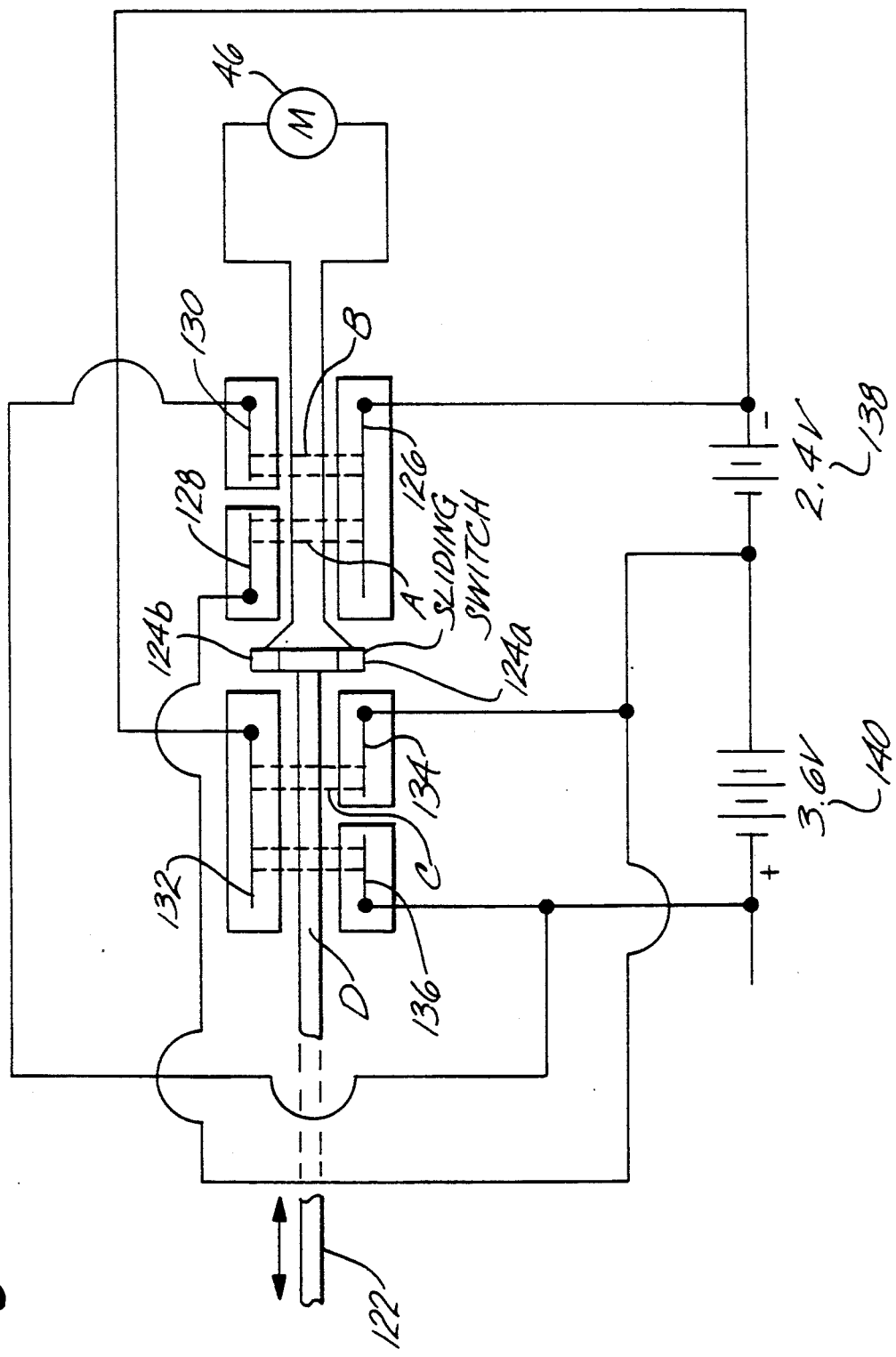
FIG. 3a is a schematic diagram of a multiple position reversing switch arrangement for control of the drive means.

In the embodiment of the shown in the drawings and best seen in FIG. 1b, rotation of the seat is controlled by lever 58 on the throttle quadrant. A third Gold-N-Rod cable 122 connects the control lever to a switch mechanism 124 for controlling the electric motor. An electrical control cable 126 connects the switch to the motor. FIG. 3a shows a first configuration for the switch to provide multiple forward and reverse speeds for the motor. Motion of the Gold-N-Rod cable 122 draws sliding switch contacts 124a and 124b across bus bar contacts for two forward and two reverse speeds. A forward common bar 126 engages contact 124a while a first forward contact bar 128 engages contact 124b with the sliding switch in the position shown by phantom lines A. Contact 124b contacts a second forward speed bus bar 130 with the sliding switch in position designated by phantom lines B. Similarly for the reverse direction of the motor, a common reverse bar 132 is engaged by contact 124b while a first speed bar 134 is contacted by contact 124a with the sliding switch in phantom position C, and a second speed bar 136 is contacted by contact 124a with the sliding switch in phantom position D. Contacts 124a and 124b are electrically connected to the poles of the motor 46. A first 2.4 volt battery 138 is connected for the first forward and reverse speeds while a second 3.6 volt battery 140 is series connected for the second speed.

FIG. 3b demonstrates a continuously variable switch for forward and reverse control of the motor for rotational positioning of the seat. Motion of cable 122 positions a contact 144 and a wiper 146 from a first "off" position to a forward position contacting a forward bus bar 148 with contact 144 and a resistor element 150 with wiper 146 as shown in phantom position E. Positioning of the contact and wiper at various locations along the resistor varies current supplied from the battery 152 to the motor thereby allowing infinite speed control. Similarly for the reverse direction, positioning of the contact and wiper on reverse bus bar 154 and resistor 156 respectively, as shown in phantom F provides an infinitely variable current of reverse polarity to the motor.

Those skilled in the art will recognize that electronic speed control units may be substituted for the multiple position and infinitely variable switch arrangements shown herein.

Having now fully described the invention as required by the patent statutes, those skilled in the art will find little difficulty in modifying the present to accommodate specific needs. Such modifications are within the scope and intent of the invention as defined in the following claims.

What is claimed is:

1. A radio controlled model pilot's station for use with a standard control radio having dual joysticks, the first joystick for aileron and elevator control, the second joystick for throttle and rudder control, the station comprising:

a chair to accommodate the pilot,
the chair having a seat rotatably mounted to a base,
a foot rest attached to the seat,
a rudder bar pivotally attached to the foot rest,
a radio shelf pivotally mounted to the seat,
the shelf having a first operating position over the pilot's lap, and a second open position rotated 90° from said first operating position allowing ingress and egress of the pilot from the seat,
a means for releasably attaching the radio to the shelf,
a drive means connected to the chair to controllably rotate the seat,
a throttle control attached to the seat,
a manual chair position control attached to the seat and operably connected to the drive means whereby the pilot rotates the seat to maintain visual contact with a model aircraft being controlled,
a first interconnection means for connecting the rudder bar and second joystick,
a first interconnection means releasably attached to the second joystick,
a second interconnection means for connecting the throttle control and second joystick,
the second interconnection means releasably attached to the second joystick.

2. A device as claimed in claim 1 further comprising:
a control stick comprising a cylindrical column having an axial bore in a first end thereof to axially receive the first joystick, and
means for releasably securing the first joystick within said axial bore.

3. As defined in claim 1 wherein the drive means comprises:
a reversible electric motor,
a first pulley driven by the motor,
a second pulley attached to the seat, and a belt interconnecting the first and second pulleys.

4. A device as defined in claim 3 wherein the chair position control comprises:
 a switch having at least three positions,
 the switch connected to the electric motor for forward, off, and reverse control of the motor.

5. A device as defined in claim 4 wherein the electric motor is a variable speed motor and the switch has a plurality of positions for forward drive of the motor and a plurality of positions for reverse drive of the motor.

6. A device as defined in claim 4 wherein the electric motor is a variable speed motor and wherein the switch is infinitely variable in forward and reverse positions.

7. A device as defined in claim 1 wherein the first interconnection means comprises:
 a control cable having an outer sheath attached to the foot rest and a lower surface of the control shelf, and
 an inner cable connected to the rudder bar and a first end of a first J-connector,
 a first leg of the first J-connector constrained for reciprocal motion to the lower surface of the shelf,
 a bottom of the first J-connector extending around one side of the shelf, and
 a second leg of the first J-connector extending over a top surface of the shelf to pivotally engage the second joystick.

8. A device as defined in claim 7 wherein the second interconnection means comprises:
 a second control cable having an outer sheath connected to a throttle quadrant case and the lower surface of the shelf, and an inner cable connected to a throttle lever and a second J-connector,
 the second J-connector having a first leg constrained for reciprocal motion to the lower surface of the shelf,
 a bottom of the second J-connector extending around a second side of the shelf and a second leg of the second J-connector extending over the top surface of the shelf to pivotally engage the second joystick, the second J-connector perpendicular to the first J-connector.

9. A device as defined in claim 1 wherein the shelf is pivotally connected to the seat for rotation about an axis in the plane of the shelf for movement from the first position to the second position.

10. A device as defined in claim 8 wherein each of the first and second J-connectors are constrained for reciprocal motion by at least one slide bushing,
 the slide bushing having a body portion with a bore therethrough to receive the first leg of the J-connector,
 the first leg sliding in the bore for reciprocal motion of the connector while free to rotate axially in the bore.

11. A device as claimed in claim 1 wherein the releasable attachment means comprises:
 a resilient pad to receive the radio and at least one releasable clamp attached to the shelf and urging the radio into the resilient pad.

12. A device as claimed in claim 11 wherein the at least one releasable clamp comprises:
 a gripping member engaging the radio and spring means for interconnecting the clamp and shelf and urging the gripping member toward the resilient pad.

13. A radio controlled model pilot's station for use with a standard control radio having dual joysticks, the first joystick for aileron and elevator control, the second joystick for throttle and rudder control, the station comprising:
 a chair to accommodate the pilot,
 the chair having a seat rotatably mounted to a base,
 a foot rest attached to the seat,
 a rudder bar pivotally attached to the foot rest,
 a radio shelf pivotally mounted to the seat,
 the shelf having a first operating position over the pilot's lap; and
 a second open position allowing ingress and egress of the pilot from the seat,
 said shelf pivotally connected to the seat for rotation about an axis in the plane of the shelf for movement from the first position to the second position,
 a means for releasably attaching the radio the shelf,
 a drive means connected to the chair to controllably rotate the seat,
 a chair position control attached to the seat and operably connected to the drive means,
 a throttle control connected to the seat,
 a control cable having an outer sheath attached to the foot rest and a lower surface of the control shelf, and
 an inner cable connected to the rudder bar and a first end of a first J-connector,
 a first leg of the first J-connector constrained for reciprocal motion to the lower surface of the shelf,
 a bottom of the first J-connector extending around one side of the shelf, and
 a second leg of the first J-connector extending over a top surface of the shelf to pivotally engage the second joystick,
 said first J-connector releasably attached to the second joystick,
 a second control cable having an outer sheath connected a throttle quadrant case and the lower surface of the shelf, and
 an inner cable connected to a throttle lever and a second J-connector,
 the second J-connector having a first leg constrained for reciprocal motion to the lower surface of the shelf,
 a bottom of the second J-connector extending around a second side of the shelf, and
 a second leg of the second J-connector extending over the top surface of the shelf to pivotally engage the second joystick, the second J-connector perpendicular to the first J-connector,
 the second J-connector releasably attached to the second joystick.

* * * * *

UNITED STATES PATENT AND TRADEMARK OFFICE
CERTIFICATE OF CORRECTION

PATENT NO.    : 5,129,826
DATED         : July 14, 1992
INVENTOR(S)   : Robert J. Munsch It is certified that error appears in the above-identified patent and that said Letters Patent is hereby corrected as shown below:

On the title page: Item:

[56] References Cited, U.S. PATENT DOCUMENTS, change
     "4,711,447  10/1987  Mansfield...272/73" to
     -- 4,711,447  12/1987  Mansfield...272/73 --.

Column 1, line 47, after "require" insert -- complex --.

Signed and Sealed this

Twenty-sixth Day of October, 1993

*Attest:*

BRUCE LEHMAN

*Attesting Officer*       *Commissioner of Patents and Trademarks*